Patented May 6, 1930

1,757,526

UNITED STATES PATENT OFFICE

LEVI L. HEDGEPETH, OF ELIZABETH CITY, NORTH CAROLINA, ASSIGNOR TO WILLIAM C. OLSEN, OF WAKE COUNTY, NORTH CAROLINA

PURIFYING WATER

No Drawing. Application filed April 17, 1928. Serial No. 270,793.

The present invention relates to the purification and decolorizing of water, and is an improvement in that phase of the art generally described as coagulation.

Modern tendencies are toward increasing the rate of treatment and filtration, and while this invention is primarily adapted for mechanical and rapid sand filtration, it is equally applicable in slow sand filtration plants and other processes. The invention may be practiced in the sedimentation or settling chambers as well as in the filter proper, and in fact wherever tests reveal the necessity for removal of contained soluble or insoluble matter in the raw water or filtrate.

It is recognized that to make water safe, inoffensive, and harmless, there must be a complete removal of bacteria, and specifically the pathogenic species. On the other hand, the physical character of water is often such as to be dangerous and, even when harmless, the user becomes alarmed at the appearance of even a slight amount of color, odor, taste and other peculiarities. Such objectionable properties are due to the presence of bacteria, suspended organic and inorganic matter, colloidal organic and inorganic matter and gases of organic decay and other causes well known to the filtration chemist.

The theory of coagulation is now well recognized and the formation of a gelatinous insoluble precipitate by means of coagulants, such as iron sulfate and lime $Fe(OH)_2$ and alum and an alkali $Al(OH)_3$ to form a floc has been practiced with some success, the coagulum acting to enmesh, mutually precipitate, and trap contained particles of bacteria, color, etc., in the water, which precipitated matter is removed from the water in the settling basins and the filter sand.

In case the raw water, or by the usual coagulation, the water has the following characteristics, my treatment need not be employed, although it may be useful to increase the purity:

Color _ _ _ _ _ _ _ _ less than 10 parts per million
Free alum _ _ _ _ less than 0.1 parts per million
Free iron _ _ _ _ less than 0.1 parts per million
Iron _ _ _ _ _ _ _ _ less than 0.5 parts per million But in many cases by reason of the character of the water, notwithstanding that doses of coagulant and alkali are adjusted to every conceivable condition, the coagulation is not sufficiently effective and one or more of these objectionable properties is present as a residue. As a result, the impurities pass through the filter and the water is unsatisfactory. This is often true of color which remains finely suspended or dispersed in the effluent due to incomplete coagulation, and also in the case of coagulants when the optimum amount of hydroxide is not formed. In the same manner, the other undesirable properties remain.

The problem is, therefore, to produce prior to filtration complete mutual coagulation of the coagulant employed and the objectionable matter at which removal is directed.

The most persistent objectionable matters in filtered waters are color, free coagulant and gas, and in raw waters is turbidity, color, gases and bacteria.

Color may be ascribed as due to vegetable infusions, and is often present as humic, galic and tannic acids and glucosides in the water leached, for example, from swamp watersheds. Such color, is present as negatively charged colloidal dispersion, and is mainly in the form of highly colored organic dyes.

Color is also present as inorganic soluble and suspended matter on various forms, such as clays, silt, alkalies and metals.

The free coagulant is usually present as a result of incomplete reaction of the coagulants, and the lack of proper precipitation due to the pH of the coagulated water. Similarly, this failure of the coagulum due to the nature and pH of the effluent, and the character of the coagulants may have the undesirable effect of more finely dispersing the color and precipitate as well as preventing precipitation of much of the matter in solution.

The gas, mainly $CO_2$, is present in the water or formed during treatment, and by my invention is reduced to a minimum.

The present invention, broadly stated, is directed to the production of double precipitation, prior to filtration, or what in effect, is preliminary and finally complete coagulation. This is accomplished by using one or more of the coagulants in such a manner that the pH of the effluent is at the isoelectric point, or at the point of maximum insolubility of a considerable portion of the precipitated matter, as well as soluble matter in suspension and colloidal matter in dispersion.

If this first floc, or first step, of the process produces a coagulation, such that the water is fit for use without further treatment, the second step of my invention need not be employed.

However, as stated, in the usual practice of coagulation, in some types of waters, particularly highly colored waters, such first step is not adequate, because there is usually left residual color, $CO_2$, and residual coagulant.

Therefore, the first step of my invention consists of adding to the raw water a coagulant and adjusting the pH to a point where matter precipitated out, in suspension or colloidal dispersion, will be at its point of maximum insolubility.

In other words, the coagulants and alkalies are added in such a manner and in such quantity, that the resultant compounds, or precipitated matter are coagulated in the water at their maximum point of insolubility.

Now, at this point, there is present free color, free coagulant, and of course, soluble and insoluble compounds, and the pH of the effluent has been adjusted, if necessary, to hold these stable. However, the floc formed, and the reaction of the coagulants, is often obviously incomplete, as evidenced by the free color and free coagulant.

The invention proceeds under these circumstances toward the formation of a second floc without peptization, or disintegration of the original floc produced by this first step.

I have found that by adding a caustic coagulant to the water, after it has been coagulated by the usual method, that the pH of the effluent may be adjusted in such a manner as to cause complete reaction and precipitation of the coagulants, so that a substantially perfect coagulation will take place. The pH produced by the addition of the caustic coagulant is the isoelectric point or point of maximum insolubility for the reaction product of the coagulant. The first floc, by reason of the second treatment employed, and the pH of the effluent produced thereby, chemically, is undisturbed, and peptization or undesirable dispersion of such floc is prevented, because the precipitated coagulant at its maximum point of insolubility will form a coating or absorb any particles which might break down or become colloidally dispersed at the second pH, and this coating or combination eliminates such a possibility.

Hence, my invention relates to an adjustment of the pH of the effluent by taking into consideration the nature of the water and the quantity and character of the coagulants, and their effect upon introduction into the water. This is the first step, and in effect it may be stated to be a destruction of the colloidal stability of the raw water, and an adjustment of the pH to the isoelectric point of the insoluble matter, lakes, and some soluble matter formed. The second step, then is to eliminate the residue of the first step by employing a chemical which will increase, or decrease the pH to the point of maximum reaction of the coagulants, or the isoelectric point of insolubility for the compound formed by the reaction of the coagulants, in the water being treated.

Applying the invention in its simplest form for the purpose of exemplifying the process, it will be considered that the raw water as leached from a swamp water shed has a pH from 4.9 to 5.6, a color of 350 ppm., $CO_2$ 26 ppm, alkalinity 0. This water contains bacteria suspended organic and inorganic matter, colloidal organic and inorganic matter, and the gases of organic decay.

Under the usual treatment coagulants such as iron sulfate and lime, or alum and alkali would be applied, or alum and iron in some instances; this treatment might be adequate but, assuming that it is not sufficient, due to the presence of color and free sulfate, my treatment will be resorted to.

With my treatment, a quantity of alum sufficient to cause destruction of colloidal stability of the raw water would be added, and thereafter a sufficient quantity of alkali will be introduced to correct the pH value of the treated water to the isoelectric point, or the point of least solubility of the insoluble matter or soluble matter formed on the addition of the alum to the raw water. This insoluble matter consists of lakes, $Al(OH)_3$ enmeshed with soluble color and precipitated color, together with various compounds formed by the reaction of the organic and inorganic substances with the coagulants.

The result of this treatment is, therefore, the formation of a floc which is held stable by reason of the isoelectric point or adjusted pH of the water at this point.

At this point, it should be stated that the isoelectric value of the colloidal coloring matter, plus alum for colored waters is usually below the point where efficient alum removal can be expected.

The water at this point will have a pH of 4.7; and, if filtered, residual alum 18 ppm.; color 50 ppm.; $CO_2$ 40 ppm.; alkalinity 0; turbidity 0, and is obviously objectionable.

I, therefore, add to this water prior to filtration an alkali aluminate in such quantity as to adjust the pH of the effluent to the isoelectric point or maximum point of insolubility of $Al(OH)_3$ in that water, for example, 6.6. This point may be described as the point at which complete reaction takes place between the free alum and the alkali, and where the maximum amount of the desired precipitation of coagulant is formed, and remains absolutely insoluble.

If more alkali had been added to the water instead of the aluminate, as has frequently been tried, the result would be a dispersion of much of the insoluble matter, so that it would be beyond recovery and the process would be unsatisfactory, the redispersed coloring matter preventing the precipitation of the $Al(OH)_3$ at its isoelectric point. The addition of more, or less doses, of either of the coagulants would simply serve to produce a more difficult situation created by the excess of one or the other of the chemicals, so that in most cases an attempt at balancing would fail.

By my process, and by the use of an aluminate or a caustic coagulant, the floc already formed is not peptized or dispersed. On the contrary, the aluminum hydroxide which is formed is produced so completely and rapidly that the first floc, as well as suspended soluble and insoluble matter and the lakes becomes coated with the aluminum hydroxide or becomes absorbed by the same. Since the pH of the water is at the maximum point of insolubility for the aluminum hydroxide, and since a maximum quantity of this compound is formed, both from the reaction of the aluminate and from the residual alum of the first step, there is complete precipitation and, moreover, the coated particles are bound and held immune to peptization, because the aluminum hydroxide is at the isoelectric point.

A gelatinous mass or floc is formed by this second step, and in addition to coating the first floc and preventing peptization or dispersion thereof, or the dispersion of any aluminum hydroxide formed in the first step, or of the free alum, or alum compounds, acts in effect to increase and augment the degree of coagulation to such an extent that the water, as recovered from the filter, will have a pH of 6.6; residual alum less than 0.01 ppm.; color less than 7 ppm.; $CO_2$ less than 3 ppm.; alkalinity 13 ppm.; turbidity 0.

This process is, therefore, briefly stated, the introduction of a sufficient quantity of alum to destroy colloidal stability of the raw water, the addition of alkali to correct or adjust the pH value of the effluent to the isoelectric point of insoluble matter formed on the addition of alum, such as lakes and free sulfate and color, and then a treatment indicated for clearness as step 2, in which the effluent so formed, is treated, prior to filtration, with caustic alumina compound in proper doses to bring the pH of the water from step 1 to the isoelectric value of the reaction product of the coagulants, namely, $Al(OH)_3$. Upon the addition of the caustic alumina compound to the flocculant effluent of the first step, a gelatinous mass is formed and the effluent clouds like milk.

The aluminum hydroxide precipitates from two sources, namely, from the soluble $Al_2O_3$ in the caustic aluminate and from the residual alumina or free alum left from the first step.

The gelatinous and cloudy mass enmeshes any free coloring remaining from step 1, which was not coagulated in this step, and performs the further important function of coating the floc particles of step 1, with a layer, thus rendering the coated particles insoluble in water having a pH equal to the isoelectric value of $Al(OH)_3$. Were this coating not effected, it is clear that the uncoated particles of the matter in suspension and in colloidal dispersion as well as the lakes and other precipitated compounds present after the first step, would be immediately peptized into colloidal dispersion.

In order that some idea of the time required may be given, the raw water is treated with the alum for three minutes, after which the alkali is added and precipitation and coagulation immediately occurs, which is allowed to proceed agitated for fifteen minutes.

Thereafter, the second step is initiated by the addition of the caustic bauxite, followed by five minutes agitation, and continued sedimentation for four and one-half hours, approximately, whereupon sedimentation, filtration and chlorination are carried out successfully to produce a fit water for domestic use.

Where the raw alkalinity of the water is sufficient to react with the required alum dose, sufficient alum to adjust the pH of the water to the isoelectric point of the alumina compounds, insoluble lakes, free color and sulfate is added. This pH is necessarily varied with the water, and depends upon the color, temperature and $CO_2$. The effluent is subjected to agitation from ten to twenty minutes, during which coagulation of alumina plus color takes place. The bacteria present become enmeshed in this coagulating matter, and will eventually be removed by subsequent sedimentation and filtration.

It will be understood that the pH is adjusted to the maximum point of insolubility of the suspended or colloidal matter, and to some extent with respect to soluble formations.

Thereafter, a sufficient amount of alkaline aluminate, is added to adjust the pH of the water at this point to the isoelectric point of aluminum hydroxide for the water being treated.

It might be well to state that where the water at the end of the first step has a pH between 4.5 and 5.6, the second step raises the pH in one particular instance to 6.6, the isoelectric point of aluminum hydroxide.

After mixing for five minutes, gelatinous Al(OH)$_3$ precipitates from the aluminate added in the last step and the residual alum remaining from the first step. This precipitating Al(OH)$_3$ coats the lakes which were precipitated at a lower pH, and would ordinarily be peptized or disintegrated into colloidal dispersion by water at the isoelectric pH of aluminum hydroxide with a layer of Al(OH)$_3$, which renders the coated particles insoluble in water at the isoelectric point of Al(OH)$_3$.

The precipitating Al(OH)$_3$ enmeshes the remaining coloring matter and bacteria so that they are successfully removed by sedimentation and filtration.

Thereafter, the water is subjected to sedimentation or settling, filtration and chlorination.

Where the raw alkalinity is insufficient to react with the necessary alum dose, two steps are optional after the first treatment. In the first of these, sufficient alum may be added to provide excess alum for lake formation of all the coloring matter, and alkali to adjust the pH to the isoelectric of the lakes. This is substantially similar to the first step of the simple process, first above mentioned. The second alternate where the alkalinity is insufficient consists in adding sufficient alum and alkali aluminate to provide an excess of alum for lake formation and to adjust the pH to the insoluble point. In this case, the alum and alkaline aluminate must be carefully balanced. Thereafter, the process proceeds, as before stated, if necessary.

At this point, it should be stated that the aluminum hydroxide precipitated from the aluminate and by the reaction of the coagulants formed during the second step serves to trap and enmesh any remaining color or bacteria, or in fact any precipitated material, and it is the purpose of this second flocculation to not only promote a complete reaction and prevent colloidal dispersion, but to provide a perfect and augmented floc, so that regardless of the water treated or the coagulants employed, or how the process is conducted, all of the bacteria and free suspended or colloidal matter will be collected, and the free sulfate will be broken down and combined so that the question of alum removal will be eliminated.

Another method which has been used with success, consists in treating the raw colored water with iron sulfate, for instance, copperas oxidized completely to the ferric state with chlorine. This is introduced in order to produce coagulation of the coloring matter at its isoelectric point when combined with iron.

The effluent is agitated from ten to twenty minutes to produce uniform coagulation of the iron lakes.

Thereafter, alkaline aluminate is added to adjust the pH of the effluent to the isoelectric point of ferric aluminate hydroxide which may be substantially 6.

After five minutes mixing, the iron lakes become coated with a mixture of ferric and aluminate hydroxides, and are thus rendered insoluble.

The remaining color from step 1, and the bacteria are enmeshed at this step and are subsequently removed by the various steps of filtration, sedimentation and chlorination.

The raw water may be treated as a first step with alum, or if required, alum and alkali, or alum and alkaline aluminate, and the effluent adjusted to the isoelectric point of alum lakes, which may be indicated as approximately 4.7.

Mixing from ten until twenty minutes is resorted to in order to produce uniform coagulation of the alum lakes.

Thereupon chlorinated copperas and alkali may be added simultaneously to get an effective ferric dose and to adjust the pH to the insoluble point of ferric aluminum hydroxide which can be approximately stated as 6 or the pH can be carried to the point where the effluent reacts alkaline with phenolthalein or approximately 8.4 without much loss of efficiency.

After five minutes mixing complete coagulation results, and the alum lakes formed become coated with ferric hydroxides which are enmeshed with a little aluminum hydroxide from the residual alum left in step 1. Such lakes are formed by the reaction of the alum with the organic matter in suspension, and are rendered insoluble by this treatment.

The floc can be removed as heretofore described by sedimentation, filtration and chlorination, so that color, free coagulant, bacteria and a great mass of other well known precipitated or colloidal matter is substantially and efficiently removed and a fit water obtained.

It should be stated at this point, that the examples given are purely for the purpose of indicating the possibilities of this invention, and it will be clear to any filtration chemist that the principles and theories involved can be worked out to meet the requirements of practically any water having persistent color or objectionable properties, which cannot be efficiently removed with the known methods.

In each case, the examples indicate that my process is essentially one of double precipitation or flocculation; that it requires a consideration of the usual coagulants employed, or of any coagulants which may be used upon the matters contained in the water to the extent that the precipitated matters whether they be organic color in the form of lakes or inorganic precipitates are maintained stable by a proper use or dosage of the coagulants, such that the pH of the effluent will be adjusted to the isoelectric point of the suspended or colloidal substances.

Such substances may be in the form of soluble lakes, or insoluble organic precipitates, soluble or insoluble organic matter in suspension or colloidally dispersed, alum compounds or alum alkali compounds, or compounds produced by the reaction of the coagulants with the various materials in the water. It might be stated that much soluble matter in the water will be precipitated by reason of the adjustment and proper use of coagulants as described.

Hence, the first step results in the formation of a floc which is not so complete, but which, nevertheless, will act to trap and enmesh a considerable portion of the bacteria, color and material precipitated, or already in suspension or in colloidal dispersion. However, the maximum precipitation of the hydroxide is not present due to the improper pH to which the effluent has been adjusted to stabilize the floc formed by this first step. In order to accomplish precipitation of the hydroxide without peptizing or returning to colloidal dispersion the floc so formed, it is necessary to adjust the pH to the point of maximum insolubility of the hydroxide and to use a compound, or a chemical which will permit the reaching of this isoelectric point without the ill effect heretofore encountered where it was attempted to balance the dosage of coagulants, or use excessive alkali.

The chemicals so employed have the effect of not only precipitating the hydroxide, but also of causing the effluent to react with residual coagulant, for example, in such a manner that additional hydroxide is formed, and it will be carefully noted that the coagulation takes place at the maximum point of insolubility of the hydroxide. Hence, a very complete and perfect flocculation which augments and reinforces the first floc is produced. It is clear that the second step involving the complete precipitation of aluminum hydroxide at its isoelectric point results in the coating of particles which might peptize and return to solution, or colloidal dispersion with the insoluble compound so that the process is thoroughly efficient and no destruction of the original floc will be possible, since it is rendered immune.

While the first floc will obviously remove and coagulate a great deal of the bacteria, color, precipitated matter, etc., the second floc or gelatinous formation will completely entrap any residue as well as precipitate any remaining free sulfate which heretofore has been a problem, generally described as the difficulty of alum removal. This question of alum removal is one of the difficult spots in the art of coagulation for it is often possible to remove color only to find the insuperable difficulty of destroying the residual alum.

I have already indicated some coagulants, but I would have it understood that there may be any of a great number of well known substances, such as soluble salts of aluminum iron (in both the ferrous and ferric state) zinc, copper and other metals, which react with solutions of the hydroxides, carbonates and bicarbonates of the alkali metals and alkali earth metals to form gelatinous precipitates of the hydroxides of the metals. Alum and iron sulfate are the most usual, and I have referred particularly to them, but it will be quite clear that upon test, the most suitable of these or other coagulants may be employed.

The alkali coagulants I have already described, and they may consist, as stated, of the hydroxides, carbonates and bicarbonates of the alkali metals and alkali earth metals. For example, $NaOH$; $Na_2CO_3$ or $Ca(OH)_2$.

These are, of course, used in the first step of my invention, and for the second step I may use any caustic compound preferably, an alkaline aluminate, such as sodium aluminate, calcium aluminate or in fact any aluminate salt formed by treating an alum with an excess of any alkali, such as a mixture of soda, ash and alum. In other words, I may use an aluminate of an alkali metal, or alkali earth metal.

It will be understood that in the first step the coagulants may be added dry or in liquid form, or they may be added simultaneously, or as stated, in a definite order, or they may be mixed, either dry or in liquid form and so introduced.

With respect to the caustic coagulant employed in the second step, it may be introduced either in liquid form or dry as the case may be.

In regard to certain waters, it is possible to conceive that they contain two types of coloring matter, one of which reaches a maximum coagulation at a different pH for example 4.8, by lake formation with alum, and that at no other point, for example, 5.2, is there any coagulation effected in the presence of colloidal color. Thus, in order to obtain alum removal and color elimination, the first treatment must be followed with a treatment of caustic alumina at 6.6, precipitating aluminum hydroxide as a color enmeshing agent, and a lake water. The facts herein given are merely by way of exemplification, and are to be taken as approximate, because, obviously, the characteristics of water varies for any particular locality.

It should also be stated, that absolutely no coagulation at all takes place when the water from step 1 is adjusted to 6.6 with alkali alone. The lakes formed by the alum treatment are peptized into colloidal dispersion and in their dispersed state, actually prevent the precipitation of alum hydroxide. One means by which step 2 can be accomplished is a treatment with a caustic aluminate solution prepared either by mixing of the proper proportions of alum and alkali or the solution of dry or wet sodium aluminate. In lieu of sodium aluminate, calcium aluminate can be employed with equal success.

Reference above to the use of alum and alkali is merely by way of illustration, since iron sulfate and alkali and other of the materials herein stated may be used with equal effect.

It will be understood that the isoelectric point of iron lakes is between 4.1 and 4.2, approximately. The isoelectric point of ferric hydroxide is substantially pH 9.4. I have attempted a treatment wherein step 1 is conducted with ferrous sulfate oxidized with chlorine followed by alkali and more chlorinated copperas at a pH of 9.4 which has been partially successful, but is to some extent, difficult to employ.

Step 1 at a pH of 4.3 with alkali and chlorinated copperas and step 2, with caustic bauxite is highly successful and produces effluents of excellent quality.

Step 1 with chlorinated copperas does not leave any soluble iron, and the aluminate treatment carries the iron lakes down with the aluminum hydroxide.

It should be stated that the use of sulphuric acid and sodium aluminate with the effluent at 4.8 would be substantially the same as a treatment with alum and possibly alum and alkali for some waters. The addition of alum alone to the lake isoelectric point in step 1 will not permit sufficient alum to be introduced to produce complete colloidal destruction and coagulation, hence the necessity for alkali.

It will be moreover understood that in lighter colored waters, the addition of alum aluminate at the isoelectric point of the lakes will probably be sufficient. This is particularly true where there has been dilution of the swamp water, due to rain or flood.

I may also substitute for step 2 a treatment with caustic soda and alum in the proper proportions to raise the pH to 6.6 and provide sufficient alumina to be effective. This would be successful if the solutions were mixed before introduction into the water from step 1. In addition to caustic soda, other compounds of the alkali and alkali earth metals may be similarly utilized.

If caustic soda is first added, a rapid peptization of the lakes from step 1 commences, and the presence of this colloidal matter prevents the precipitation of alum hydroxide. Therefore, the two ingredients must be thoroughly mixed prior to treatment. The simultaneous introduction of alum and alkali is also successful in connection with step 2.

From all the description heretofore given of my invention, it will be seen that I have discovered that it is possible to raise the pH of treated water in filtration plants to the isoelectric point of an aluminum hydroxide by the use of caustic alumina or aluminate compounds as heretofore mentioned; producing a coagulant free effluent which is nearly colorless. The second step, as stated, is accomplished without peptizing or redissolving the floc formed in step 1 at the optimum coagulation pH of the raw water.

It should be stated that step 1 is the destruction of the colloidal stability of the coloring matter by treating the water with alum and adjusting the pH of the treated water to the isoelectric point of the lakes. Such lakes are formed by the reaction of the alum with the organic matter in suspension, or in colloidal dispersion and may be soluble or insoluble. Step 1 is necessary usually because the presence of colloidal coloring matter in the water causes a colloidal dispersion of aluminum hydroxide, if it were attempted to precipitate aluminum hydroxide at its isoelectric point at pH 6.6.

At the end of the second step, the water contains a certain amount of alum, sulphate from step 1, soluble lakes, uncombined color, etc. At this point, the aluminate is added to increase the pH to 6.6 and to precipitate from the aluminate and the residual alum from step 1 gelatinous aluminum hydroxide which coats the lakes described in step 1, with a layer of hydroxide and renders them immune to the peptizing action of the effluent having a pH 6.6. The second floc thus enmeshes the remaining bacteria and color, and reduces the quantity of free alum. Step 2 is the adjustment of the water to the most efficient alum removal point with a caustic aluminum compound, and brings about the precipitation of the removal of the floc and some combined alum and aluminum hydroxide from the caustic alumina and residual alum from step 1. The aluminum hydroxide precipitates, and enmeshes the color remaining from step 1 and carries it down as it precipitates and, moreover, coats the lakes as heretofore described, which lakes would be peptized into colloidal dispersion at the isoelectric point of aluminum hydroxide, the hydroxide coating rendering such lakes insoluble at a pH 6.6.

It will also be clearly understood that in water purification plants which usually treat water at low pH values that corrosion of plant equipment exposed to the water is a serious problem, and that by the use of my double treatment method a considerable lessening of this corrosiveness has been possible. This applies also to distribution systems and equipment coming in contact with the water.

It will be understood that the recapitulation is merely for purposes of illustration, and that the same results and theories are generally true when any of the other coagulants and chemicals herein mentioned are employed.

It will be clear that the floc formed in step 1, will not be disturbed, but will be augmented by the floc formed in step 2, so that the floc formed by the first step remains suspended as a physically dispersed precipitate until during and after precipitation occasioned by step 2.

The coating of the floc from step 1 with aluminum hydroxide renders the soluble lakes immune to peptization from the action of any alkali present in the floc.

Turbidity has not been discussed for the reason that it generally assists coagulation and with respect to color removal, serves to absorb considerable of the color present. The turbid precipitate is, of course, easily removed in the filter.

The gelatinous floc formed by this invention obviously will coat the filter sand, and by reason of its nature, will permit pure water to pass through and will bar the passage of water contained in suspended or colloidal matter.

It may be considered that there are two types of organic matter in the water, requiring the coagulation and a pH adjustment for the two different values.

On the other hand, it can be assumed that all the colloidal matter is precipitated in the first step and that the pH is raised to obtain maximum coagulation or precipitation of aluminum hydroxide.

The advantages of this invention as compared with the single precipitation process may be summed up to some extent as follows:

A. Better bacterial removal in the coagulation chambers and basins, and filters, due to more complete coagulation of physically and colloidally suspended matter.

B. Better color removal because of the complete removal of alum plus color compounds which in the single precipitation method, as now practiced in water plants, would remain in the filtered water.

C. Practically complete alum removal, an accomplishment impossible in the single precipitation method because of the wide disparity between the insolubility points of alum lakes and $Al(OH)_3$.

D. Increased plant economy due to—Two hundred to three hundred per cent longer filter runs, enabling us to reduce our wash water from 6% of the filter effluent in the single precipitation process, to 0.8% in the double precipitation process.

E. Lower depreciation of plant equipment because of the non-corrosiveness of the water we are able to maintain in our equipment in the double process are compared with the extremely low pH values of the single precipitation process in highly colored waters.

F. The improved taste and appearance of the water which merits public commendation of its water supply and reduces to a pleasing minimum the adverse criticisms of the public.

What I claim is:

1. The process of purifying water of the class described which comprises treating the water to form a floc and then forming a second floc without causing peptization of the first floc.

2. The process of purifying water which comprises chemically treating the water to form a flocculent precipitate and then by chemical treatment forming a second flocculent precipitate without causing peptization of the first floc, prior to sedimentation and filtration.

3. The process of purifying water of the class described which comprises treating the water to form a floc and adjust the pH of the water to the isoelectric point thereof and then treating the water to form a second floc and adjust the pH of the water to prevent peptization of either of said flocs.

4. The process of purifying water which comprises chemically treating the water to form a flocculent precipitate and to adjust the pH of the water to the isoelectric point thereof and then by chemical treatment forming a second flocculent precipitate without causing peptization of either of said flocs, prior to sedimentation and filtration.

5. The process of purifying water which comprises chemically treating the water to form a flocculent precipitate and then chemically treating the water to form a second flocculent precipitate and adjust the pH of the water to the isoelectric point of said second floc without causing peptization of either of said flocs.

6. The process of purifying water which comprises chemical treatment with a coagulant to adjust the pH of the water to the isoelectric point of the flocculent precipitate formed and subjecting the water to further chemical treatment by the addition of a coagulant prior to filtration and sedimentation.

7. The process of purifying water which comprises chemical treatment with a coagulant to adjust the pH of the water to the isoelectric point of the floc formed, and subjecting the water to a second dose of coagulant forming a second floc and adjusting the pH of the water to the isoelectric point of said second floc, prior to filtration and sedimentation.

8. The process of purifying water which comprises producing precipitation and coagulation and adjusting the pH of the water to the isoelectric point of the floc formed, and then producing further precipitation and coagulation and adjusting the pH to the isoelectric point of the floc formed without peptization of either of said flocs.

9. The process of purifying water which comprises producing precipitation and coagulation and adjusting the pH of the water to the isoelectric point of the floc formed producing further precipitation and coagulation and adjusting the pH to the isoelectric point of the floc formed without disturbing the first floc.

10. The process of purifying water which comprises chemical treatment for producing precipitation and coagulation and adjusting the pH of the water to the isoelectric point of the floc formed, producing further precipitation and coagulation and adjusting the pH to the isoelectric point of the floc formed, without disturbing the first floc.

11. The process of purifying water comprising chemical treatment for producing precipitation and flocculation of contained matter and adjusting the pH of the water to the isoelectric point of the floc formed, and introducing a chemical to form an insoluble hydroxide and adjust the pH of water to the isoelectric point of the hydroxide.

12. The process of purifying water comprising chemical treatment for producing precipitation and flocculation of contained matter, and introducing a chemical to form an insoluble hydroxide and adjust the pH of water to the isoelectric point of hydroxide.

13. The process of purifying water comprising chemical treatment for producing precipitation and flocculation of contained matter and adjusting the pH of the water to the isoelectric point of the floc formed, and introducing a chemical to form an insoluble hydroxide and adjust the pH of water to the isoelectric point of the hydroxide without disturbing the floc.

14. The process of purifying water comprising chemical treatment for producing precipitation and flocculation of contained matter and adjusting the pH of the water to the isoelectric point of the floc formed, and introducing an alkaline aluminum compound to form an insoluble hydroxide and adjust the pH of water to the isoelectric point of the hydroxide.

15. The process of purifying water comprising chemical treatment for producing precipitation and flocculation of contained matter and adjusting the pH of the water to the isoelectric point of the floc formed, and introducing an alkaline aluminate to form an insoluble hydroxide and adjust the pH of water to the isoelectric point of the hydroxide.

16. In the art of purifying colored water containing such matters as bacteria, suspended organic and inorganic matter, colloidal organic matter and the gases of organic decay, the process comprising treating the water to form a floc containing color and treating the water to form an insoluble precipitate without causing dispersion of the floc and color.

17. In the art of purifying colored water containing such matters as bacteria, suspended organic and inorganic matter, colloidal organic matter and the gases of organic decay, the process comprising treating the water to form lakes containing color and treating the water to form an insoluble precipitate without causing dispersion of the lakes.

18. In the art of purifying colored water containing such matters as bacteria, suspended organic and inorganic matter, colloidal organic matter and the gases of organic decay, the process comprising treating the water to form lakes containing color and treating the water to form an insoluble precipitate without causing dispersion of the lakes and coating the lakes with said precipitate.

19. In the art of purifying colored water containing such matters as bacteria, suspended organic and inorganic matter, colloidal organic matter and the gases of organic decay, the process comprising treating the water to form a floc containing color and treating the water to form an insoluble precipitate without causing dispersion of the floc and color and coating the soluble and insoluble particles of floc and color with said precipitate.

20. In the art of purifying colored water containing such matters as bacteria, suspended organic and inorganic matter, colloidal organic matter and the gases of organic decay, the process comprising chemically treating the water to form a floc containing color and to adjust the pH of the water to the isoelectric point of said floc and color, and subjecting the water to further chemical treatment to form an insoluble precipitate and to adjust the water to the isoelectric point of the precipitate without causing dispersion of the floc and color.

21. In the art of purifying colored water containing such matters as bacteria, suspended organic and inorganic matter, colloidal organic matter and the gases of organic decay, the process comprising chemically treating the water to form lakes containing color and to adjust the pH of the water to the isoelectric point of said lakes, and subjecting the water to further chemical treatment to form an insoluble precipitate and to adjust the water to the isoelectric point of the precipitate without causing dispersion of the lakes.

22. In the art of purifying colored water containing such matters as bacteria, suspended organic and inorganic matter, colloidal organic matter and the gases of organic decay, the process comprising chemically treating the water to form lakes containing color and to adjust the pH of the water to the isoelectric point of said lakes, and subjecting the water to further chemical treatment to form an insoluble precipitate and to adjust the water to the isoelectric point of the precipitate without causing dispersion of the lakes and coating the lakes with said precipitate.

23. In the art of purifying colored water containing such matters as bacteria, suspended organic and inorganic matter, colloidal organic matter and the gases of organic decay, the process comprising chemically treating the water to form lakes containing color and to adjust the pH of the water to the isoelectric point of said lakes, and subjecting the water to further chemical treatment to form an insoluble precipitate and to adjust the water to the isoelectric point of the precipitate without causing dispersion of the lakes and coating the soluble and insoluble particles of floc and color with said precipitate.

24. In the art of purifying colored water containing such matters as bacteria, suspended organic and inorganic matter, colloidal organic matter and the gases of organic decay, the process comprising treating the water to form a floc containing color and treating the water to form an insoluble hydroxide without causing dispersion of the floc and color.

25. In the art of purifying colored water containing such matters as bacteria, suspended organic and inorganic matter, colloidal organic matter and the gases of organic decay, the process comprising treating the water to form lakes containing color and treating the water to form an insoluble hydroxide without causing dispersion of the lakes.

26. In the art of purifying colored water containing such matters as bacteria, suspended organic and inorganic matter, colloidal organic matter and the gases of organic decay, the process comprising treating the water to form an insoluble hydroxide without causing dispersion of the lakes and coating the lakes with said hyroxide.

27. In the art of purifying colored water containing such matters as bacteria, suspended organic and inorganic matter, colloidal organic matter and the gases of organic decay, the process comprising treating the water to form an insoluble hydroxide without causing dispersion of the lakes and coating the lakes with said hydroxide.

28. In the art of purifying colored water containing such matters as bacteria, suspended organic and inorganic matter, colloidal organic matter and the gases of organic decay, the process comprising treating the water to form a floc containing color and treating the water to form an insoluble hydroxide without causing dispersion of the floc and color and coating the soluble and insoluble particles of floc and color with said hydroxide.

29. In the art of purifying colored water containing such matters as bacteria, suspended organic and inorganic matter, colloidal organic matter, and the gases of organic decay, the process comprising chemically treating the water to form a floc containing color and to adjust the pH of the water to the isoelectric point of said floc and color, and subjecting the water to further chemical treatment with an alkaline aluminum compound to form an insoluble precipitate and to adjust the water to the isoelectric point of the precipitate without causing dispersion of the floc and color.

30. In the art of purifying colored water containing such matters as bacteria, suspended organic and inorganic matter, colloidal organic matter and the gases of organic decay, the process comprising chemically treating the water to form lakes containing color and to adjust the pH of the water to the isoelectric point of said lakes, and subjecting the water to further chemical treatment with an alkaline aluminum compound to form an insoluble precipitate and to adjust the water to the isoelectric point of the precipitate without causing dispersion of the lakes.

31. In the art of purifying colored water containing such matters as bacteria, suspended organic and inorganic matter, colloidal organic matter and the gases of organic decay, the process comprising chemically treating the water to form lakes containing color and to adjust the pH of the water to the isoelectric point of said lakes, and subjecting the water to further chemical treatment with an alkaline aluminum compound to form an insoluble precipitate and to adjust the water to the isoelectric point of the precipitate without causing dispersion of the lakes and coating the lakes with said precipitate.

32. In the art of purifying colored water containing such matters as bacteria, suspended organic and inorganic matter, colloidal organic matter and the gases of organic decay, the process comprising chemically treating the water to form a floc containing color and to adjust the pH of the water to the isoelectric point of said floc and color, and subjecting the water to further chemical treatment with an alkaline aluminum compound to form an insoluble precipitate and to adjust the water to the isoelectric point of the precipitate without causing dispersion of the floc and color and coating the soluble and insoluble particles of floc and color with said precipitate.

33. In the art of purifying water the step which consists in treating the water after coagulation in the presence of a residue of color, lakes and free coagulant which comprises adjusting the pH of the water to prevent peptization and adding a chemical which will react with the water and free coagulant to produce a maximum of insoluble precipitate.

34. In the art of purifying water the step which consists in treating the water after coagulation in the presence of a residue of color, lakes and free coagulant which comprises adjusting the pH of the water to prevent peptization and adding a caustic substance which will react with the water and free coagulant to produce a maximum of insoluble precipitate.

35. In the art of purifying water the step which consists in treating the water after coagulation in the presence of a residue of color, lakes and free coagulant which comprises adjusting the pH of the water to prevent peptization and adding an alkaline aluminate which will react with the water and free coagulant to produce a maximum of insoluble precipitate.

In testimony whereof I have hereunto set my hand.

LEVI L. HEDGEPETH.